United States Patent
Plambeck

(10) Patent No.: US 6,801,993 B2
(45) Date of Patent: Oct. 5, 2004

(54) TABLE OFFSET FOR SHORTENING TRANSLATION TABLES FROM THEIR BEGINNINGS

(75) Inventor: Kenneth E. Plambeck, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 09/967,178

(22) Filed: Sep. 28, 2001

(65) Prior Publication Data

US 2003/0074541 A1 Apr. 17, 2003

(51) Int. Cl.⁷ .............................................. G06F 12/00
(52) U.S. Cl. ........................... 711/206; 711/6; 711/220
(58) Field of Search ............................. 711/6, 203, 213, 711/217, 220, 221

(56) References Cited

U.S. PATENT DOCUMENTS

| | | | | |
|---|---|---|---|---|
| 4,569,018 A | * | 2/1986 | Hummel et al. | 711/207 |
| 4,802,084 A | * | 1/1989 | Ikegaya et al. | 711/6 |
| 4,899,275 A | * | 2/1990 | Sachs et al. | 711/3 |
| 4,945,480 A | * | 7/1990 | Clark et al. | 711/6 |
| 5,465,337 A | | 11/1995 | Kong | 711/207 |
| 5,530,820 A | * | 6/1996 | Onodera | 709/1 |
| 5,765,207 A | * | 6/1998 | Curran | 711/203 |
| 6,014,733 A | | 1/2000 | Bennett | 711/216 |
| 6,560,687 B1 | * | 5/2003 | Tsai et al. | 711/202 |

OTHER PUBLICATIONS

Microsoft Press Computer Dictionary, 3rd Edition, 1997, p. 339.*
"z/Architecture—Principles of Operation," IBM Publication No. SA22–7832–00 (Dec. 2000).

* cited by examiner

Primary Examiner—Nasser Moazzami
Assistant Examiner—Christian P. Chace
(74) Attorney, Agent, or Firm—Floyd A. Gonzalez, Esq.; Wayne F. Reinke, Esq.; Heslin Rothenberg Farley & Mesiti, P.C.

(57) ABSTRACT

A virtual address is translated to a real address using one or more tables at varying levels. An entry of a table is indexed based in part on a table origin and a table offset. The virtual address includes one or more indexes corresponding to the one or more varying level tables. A table is addressed as a function of the table origin and the corresponding index in the virtual address. The table offset indicates the actual beginning of the table from the origin.

15 Claims, 4 Drawing Sheets

TABLE OFFSET FOR SHORTENING TRANSLATION TABLES FROM THEIR BEGINNINGS

BACKGROUND OF THE INVENTION

1. Technical Field

The present invention generally relates to translation of virtual addresses to real addresses in a data processing system. More particularly, the present invention relates to the use of a table offset as part of the translation of a virtual address to a real address in a data processing system.

2. Background Informatiom

Data processing systems which use virtual addressing in multiple virtual address spaces are well known. Many data processing systems include, for example, a central processing unit (CPU) and a main storage. The CPU contains the sequencing and processing facilities for instruction execution, interruption action, timing functions, initial program loading and other machine related functions. The main storage is directly addressable and provides for high-speed processing of data by the CPU. The main storage may be either physically integrated with the CPU or constructed in stand-alone units.

In general, address spaces reside in main storage wherein an address space is a consecutive sequence of integer numbers (or virtual addresses), together with the specific transformation parameters which allow each number to be associated with a byte location in storage. The sequence starts at zero and proceeds left to right.

When a virtual address is used by a CPU to access main storage, it is first converted, by means of dynamic address translation (DAT), to a real address, and then, by means of prefixing, to an absolute address. DAT uses various levels of tables as transformation parameters. The designation (in the past, including origin and length) of a table is found for use by DAT in a control register or as specified by an access register.

DAT uses, at different times, the segment-table designations in different control registers or specified by the access registers. The choice is determined by the translation mode specified in the current program-status word (PSW). Four translation modes are available: primary-space mode, secondary-space mode, access-register mode (AR-mode), and home-space mode. Different address spaces are addressable depending on the translation mode.

Dynamic address translation (DAT) translates a virtual address of a computer system to a real address by means of translation tables. The bit string comprising a virtual address is divided, from left to right, into one or more table indexes and one byte index. The leftmost table index is multiplied by a table width and added to a predetermined table origin to form the address of an entry in the designated table. The next table index is multiplied by a table width and added to a table origin obtained from the entry in the first table to form the address of an entry in a second table. This process continues until all table indexes have been processed. The entry in the last table contains, instead of another table origin, a real address that is substituted for the concatenation of table indexes and concatenated with the byte index of the virtual address to form the real address resulting from the translation.

It has been the practice to include in the designation of the highest-level table and in each table entry that designates another table a field indicating the length of the designated table, at least when the table can be of significant size. A table-length field is a bit string of n bits. The leftmost n bits of an index are compared to the table-length bits for the corresponding table, and, if the value of the index bits is greater than the value of the table-length bits, the index is considered invalid and an exception is recognized (an interruption occurs) instead of proceeding with the translation. The table length has the advantage of saving storage that would be occupied by the unneeded end of a table.

However, it is sometimes the case that an address space is sparsely populated. One example is where an identifier of an object is used to form the address representation of that object in an address space. For example, if an object has an eight-character random name, the name could be used to form the address representation. It would be helpful in such situations to know where the necessary part of the designated table actually begins in order to save the storage that would otherwise be occupied by the unneeded beginning of the table.

Thus, a need exists for a way to indicate the actual beginning of a table in a virtual-to-real address translation.

SUMMARY OF THE INVENTION

Briefly, the present invention satisfies the need for a way to indicate the actual beginning of a table in a virtual-to-real address translation by providing a table offset.

The table offset field saves the storage at the beginning of the table that would otherwise be occupied by the table.

In accordance with the above, it is an object of the present invention to indicate an actual beginning of a table in the translation of a virtual address to a real address.

The present invention provides, in a first aspect, a method of translating a virtual address to a real address. The method comprises indexing into an entry of a first table based on a table origin and a table offset.

Systems and program products corresponding to the method of the first aspect are also provided in second and third aspects of the invention, respectively.

These, and other objects, features and advantages of this invention will become apparent from the following detailed description of the various aspects of the invention taken in conjunction with the accompanying drawings.

DETAILED DESCRIPTION OF THE INVENTION

Figure 1:
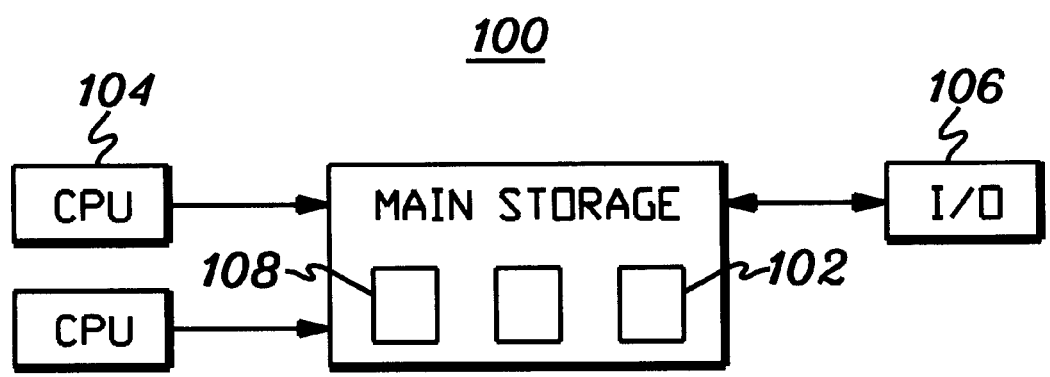
FIG. 1 is a block diagram of one example of a system in accordance with the present invention.

As shown in FIG. 1, system 100 includes, for instance, a main storage 102, one or more central processing units (CPUs) 104 and one or more input/output devices 106.

In general, input devices 106 are used to load data and/or programs into main storage 102, and central processing units 104 are used to access the stored program or data from main storage. As previously described, main storage 102 includes one or more address spaces 108, wherein an address space is a consecutive sequence of integer numbers (or virtual addresses), together with the specific transformation parameters which allow each number to be associated with a byte location in storage. Typically, an entire virtual address space 108 is not resident within main storage. Instead, only that portion associated with a program or data being accessed or used by one or more of the processors is resident within the main storage.

The above-described computing environment and/or computing units are only offered as examples. The present invention can be incorporated and used with many types of computing units, computers, processors, nodes, systems, work stations and/or environments without departing from the spirit of the present invention. For example, the computing unit may be based on the UNIX architecture. Additionally, the present invention is relevant to servers and clients. Other types of computing environments can benefit from the present invention and are thus considered a part of the present invention.

Figure 2:
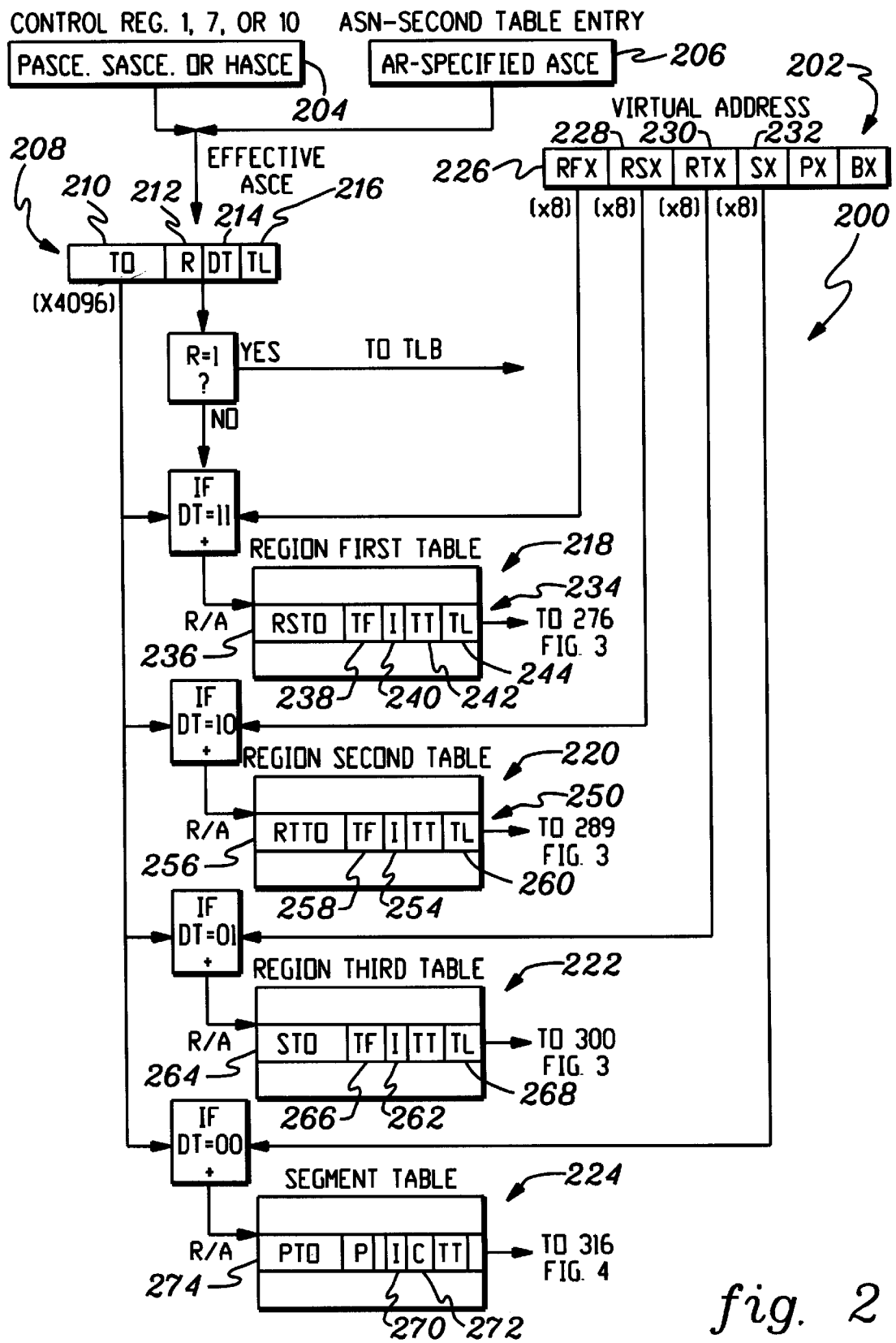
FIGS. 2–4 are flow diagrams of one example of a virtual-to-real address translation in accordance with the present invention.

The present invention will be described with reference to an example translation shown graphically in FIGS. 2–4 via flow diagram 200 and taken from IBM's z/Architecture, Principles of Operation, SA22-7832-00 (December 2000)—which is herein incorporated by. In the z/Architecture translation of a virtual address 202 is controlled by the DAT-mode bit and address-space-control bits in the PSW and by the address-space-control elements (ASCEs) 204 in control registers (not shown) and as specified by the access registers 206. When the ASCE used in a translation is a region-first-table designation, the translation is performed by means of a region first table, region second table, region third table, segment table, and page table, all of which reside in real or absolute storage, with the "or" in this construction meaning it is unpredictable whether prefixing is applied. When the ASCE is a lower-level type of table designation (region-second-table designation, region-third-table designation, or segment-table designation), the translation is performed by means of only the table levels beginning with the designated level, and the virtual-address bits that would, if nonzero, require use of a higher level or levels of table must be all zeros; otherwise, an ASCE-type exception is recognized. When the ASCE is a real-space designation, the virtual address is treated as a real address, and table entries in real or absolute storage are not used.

The address-space-control element (ASCE) used for a particular address translation is called the effective ASCE 208. The effective ASCE is comprised of a table origin 210, a real-space control 212, a designation type 214 and a table length 216. Accordingly, when a primary virtual address is translated, the contents of one control register are used as the effective ASCE. Similarly, for a secondary virtual address, the contents of another control register are used; for an AR-specified virtual address, the ASCE specified by the access register is used; and for a home virtual address, the contents of still another control register are used.

Although in this example the effective ASCE does not contain a table offset for the indicated table, it will be understood that it could. A table offset is less important for the table designated by the effective ASCE since there is only one such table. In contrast, in this example, there may be 2K (2,048) next-lower-level tables and, for each of them, another 2K next-lower-level tables, and so forth. Thus, in this example, if the effective ASCE designates a region first table, there may be a total of 8 G (8,589,934,592) segment tables, each requiring potentially 16K (16,384) bytes of storage.

When the effective address-space-control element (ASCE) 208 contains a real-space control 212, having the value zero, the ASCE is a region-table or segment-table designation. When the real-space control is one, the ASCE is a real-space designation.

When the real-space control is zero, the designation-type 214 in the effective address-space-control element (ASCE), specifies the table-designation type of the ASCE. Depending on the type, some number of leftmost bits of the virtual address 202 being translated must be zeros; otherwise, an ASCE-type exception is recognized. For each possible value of the table-designation type, the indexes in the virtual-address required to be zeros are as follows in Table I:

TABLE I

| DT 214 | Designation Type | Virtual-Address Portion (s) Required to Be Zeros |
| --- | --- | --- |
| 11 | Region-first-table 218 | None |
| 10 | Region-second-table 220 | Region first index 226 |
| 01 | Region-third-table 222 | Region first and second indexes 226, 228 |
| 00 | Segment-table 225 | Region first, second and third indexes 226, 228, 230 |

The designation-type 214 of the effective address-space-control element (ASCE) specifies both the table-designation type of the ASCE and the portion of the virtual address that is to be translated by means of the designated table, as follows in Table II:

TABLE II

| DT 214 | Designation Type | Virtual-Address Portion Translated by the Table |
| --- | --- | --- |
| 11 | Region-first-table 218 | Region first index 226 |
| 10 | Region-second-table 220 | Region second index 228 |
| 01 | Region-third-table 222 | Region third index 230 |
| 00 | Segment-table 224 | Segment index 232 |

In addition to the region and segment indexes, the virtual address also includes a page-table index (PX) and a byte index (BX). The byte index is eventually concatenated with the page frame real address 246 of the page table 248 to obtain the real address.

When the designation type has the value 11 binary, the region-first-index portion 226 of the virtual address, in conjunction with the table origin 210 contained in the ASCE, is used to select an entry 234 from the region first table. The entry is comprised of a region-second-table origin 236, a table offset 238, an invalid bit 240, a table type 242, and a table length 244. The table offset indicates where the region-second table actually begins relative to the RSTO. The inclusion of the table offset saves the space between RSTO and the actual beginning that would otherwise be occupied by the region-second table. The table length indicates the length of the region-second table taken from the RSTO of the table.

The 64-bit address of the region-first-table entry 234 in real or absolute storage ("R/A" in FIGS. 2–4), is obtained by appending 12 zeros to the right of bits 0–51 of the region-first-table designation (i.e., conceptually multiplying by 4096) and adding the region first index with three rightmost and 50 leftmost zeros appended (i.e., conceptually multiplying the region first index by 8, the width of a table entry). When a carry out of bit position 0 occurs during the addition, an addressing exception may be recognized, or the carry may be ignored, causing the table to wrap from $2^{64}-1$ to zero. All 64 bits of the address are used, regardless of whether the current PSW specifies the 24-bit, 31-bit, or 64-bit addressing mode.

As part of the region-first-table-lookup process, the first two bits of the region first index in the virtual address are compared against the table length 216 of the region-first-table designation, to establish whether the addressed entry is within the region first table. If the value in the table-length field is less than the value in the corresponding bit positions of the virtual address, a region-first-translation exception is recognized. The comparison against the table length may be omitted if the equivalent of a region-first-table entry in the translation-lookaside buffer 252 is used in the translation.

All eight bytes of the region-first-table entry appear to be fetched concurrently as observed by other CPUs. The fetch access is not subject to protection. When the storage address generated for fetching the region-first-table entry designates a location which is not available in the configuration, an addressing exception is recognized, and the unit of operation is suppressed.

Invalid bit 240 of the entry fetched from the region first table specifies whether the corresponding set of regions is available. This bit is inspected, and, if it is one, a region-first-translation exception is recognized.

A translation-specification exception is recognized if the table-type 242 in the region-first-table entry does not have the same value as the designation type 214 of the ASCE.

When no exceptions are recognized in the process of region-first-table lookup, the entry fetched from the region first table designates the origin and specifies the offset and length of the corresponding region second table.

When the designation type 214 of the ASCE has the value 10 binary, the region-second-index 228 portion of the virtual address 202, in conjunction with the table origin 210 contained in the ASCE, is used to select an entry from the region second table 220. The first two bits of the region second index 228 are compared against the table length 216 in the ASCE. If the value in the table-length field is less than the value in the corresponding bit positions of the virtual address, a region-second-translation exception is recognized. The comparison against the table length may be omitted if the equivalent of a region-second-table entry in the translation-lookaside buffer 252 is used in the translation. The region-second-table-lookup process is otherwise the same as the region-first-table-lookup process, except that a region-second-translation exception is recognized if the invalid bit 254 is one in the region-second-table entry. When no exceptions are recognized, the entry fetched from the region second table designates the origin 256 and specifies the offset 258 and length 260 of the corresponding region third table.

When the designation type 214 of the ASCE has the value 01 binary, the region-third-index 230 portion of the virtual address, in conjunction with the table origin 210 contained in the ASCE, is used to select an entry from the region third table 222. The first two bits of the region third index 230 are compared against the table length 216 in the ASCE. If the value in the table-length field is less than the value in the corresponding bit positions of the virtual address, a region-third-translation exception is recognized. The comparison against the table length may be omitted if the equivalent of a region-third-table entry in the translation-lookaside buffer 252 is used in the translation. The region-third-table-lookup process is otherwise the same as the region-first-table-lookup process, including the checking of the table-type bits in the region-third-table entry, except that a region-third-translation exception is recognized if the invalid bit 262 is one in the region-third-table entry. When no exceptions are recognized, the entry fetched from the region third table designates the origin 264 and specifies the offset 266 and length 268 of the corresponding segment table.

When the designation type 214 of the ASCE has the value 00 binary, the segment-index portion 232 of the virtual address 202, in conjunction with the table origin 218 contained in the ASCE, is used to select an entry from the segment table 224. The first two bits of the segment index 232 are compared against the table length 216 in the ASCE. If the value in the table-length field is less than the value in the corresponding bit positions of the virtual address, a segment-translation exception is recognized. The comparison against the table length may be omitted if the equivalent of a segment-table entry in the translation-lookaside buffer 252 is used in the translation. A segment-translation exception is recognized if the invalid bit 270 is one in the segment-table entry. The segment-table-lookup process is otherwise the same as the region-first-table-lookup process, including the checking of the table-type bits in the segment-table entry, except that a segment-translation exception is recognized if the invalid bit 270 is one in the segment-table entry. When no exceptions are recognized, the entry fetched from the segment table designates the origin 274 of the corresponding page table.

When the effective address-space-control element (ASCE) is a region-table designation, a region-table entry is selected as described above. The contents of the selected entry and the next index portion of the virtual address are used to select an entry in the next-lower-level table, which may be another region table or a segment table.

When the table entry selected by means of the effective ASCE is a region-first-table entry, the region-second-index portion of the virtual address, in conjunction with the region-second-table origin contained in the region-first-table entry, is used to select an entry from the region second table.

Figure 3:
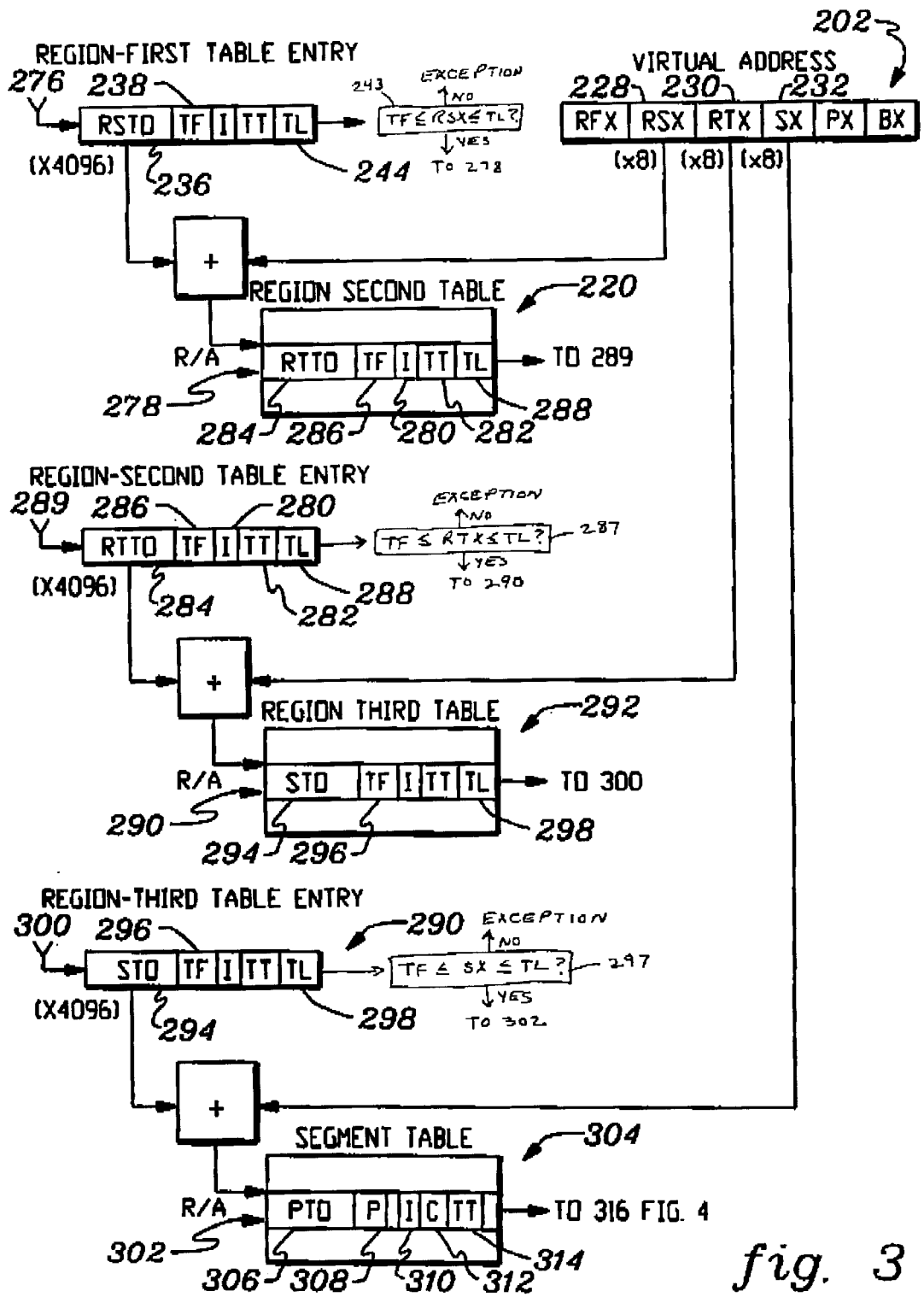

As shown at 276 in FIG. 3, the 64-bit address of the region second table entry 278 in real or absolute storage is obtained by appending 12 zeros to the right of bits 0–51 of the region first table entry and adding the region second index with three rightmost and 50 leftmost zeros appended. In other words, the region-second-table origin 236 with appended zeros and the region-second-table index 228 with appended zeros are added together. When a carry out of bit position 0 occurs during the addition, an addressing exception may be recognized, or the carry may be ignored, causing the table to wrap from $2^{64}-1$ to zero. All 64 bits of the address are used, regardless of whether the current PSW specifies the 24-bit, 31-bit, or 64-bit addressing mode.

As part of the region-second-table-lookup process, the first two bits of the region second index 228 are compared 243 against the table offset 238 of the region-first-table entry, and against the table length 244 of the region-first-table entry, to establish whether the addressed entry is within the region second table. If the value in the table-offset field is greater than the value in the corresponding bit positions of the virtual address, or if the value in the table-length field is less than the value in the corresponding bit positions of the virtual address, a region-second-translation exception is recognized.

All eight bytes of the region-second-table entry 278 appear to be fetched concurrently as observed by other CPUs. The fetch access is not subject to protection. When the storage address generated for fetching the region-second-table entry designates a location which is not available in the configuration, an addressing exception is recognized, and the unit of operation is suppressed.

An invalid bit 280 of the entry fetched from the region second table specifies whether the corresponding set of regions is available. This bit is inspected, and, if it is one, a region-second-translation exception is recognized.

A translation-specification exception is recognized if the table type 282 in the region-second-table entry does not have a value that is one less than the value of the table type in the next-higher-level table, i.e., table type 242.

When no exceptions are recognized in the process of region-second-table lookup, the entry 278 fetched from the region second table designates the beginning 284 and specifies the offset 286 and length 288 of the corresponding region third table.

As shown at 289 in FIG. 3, when the table entry selected by means of the effective ASCE 208 is a region-second-table entry 278, or if a region-second-table entry has been selected by means of the contents of a region-first-table entry 234, the region-third-index portion 230 of the virtual address 202, in conjunction with the region-third-table origin 284 contained in the region-second-table entry, is used to select an entry 290 from the region third table 292. The first two bits of the region third index 230 are compared 287 against the table offset 286 and table length 288 in the region-second-table entry. A region-third-translation exception is recognized if the table offset is greater than the first two bits, if the table length is less than the first two bits, or if the invalid bit 280 is one in the region-third-table entry. The region-third-table-lookup process is otherwise the same as the region-second-table-lookup process, including the checking of the table-type bits in the region-third-table entry, except that a region-third-translation exception is recognized if the invalid bit 262 is one in the region-third-table entry. When no exceptions are recognized, the entry 290 fetched from the region third table 292 designates the origin 294 and specifies the offset 296 and length 298 of the corresponding segment table.

As shown at 300 in FIG. 3, when the table entry selected by means of the effective ASCE is a region-third-table entry, or if a region-third-table entry has been selected by means of the contents of a region-second-table entry, the segment-index portion 232 of the virtual address, in conjunction with the segment-table origin 294 contained in the region-third-table entry 290, is used to select an entry 302 from the segment table 304. Entry 302 comprises a page table origin 306, a page protection bit 308, an invalid bit 310, a common segment bit 312, and a table type field 314.

The first two bits of the segment index 232 are compared 297 against the table offset 296 and table length 298 in the region-third-table entry. A segment-translation exception is recognized if the table offset is greater than the first two bits, if the table length is less than the first two bits, or if the invalid bit 310 is one in the segment-table entry. A translation-specification exception is recognized if (1) the page protection bit 308 in the entry is one and (2) the common-segment bit 312 in the entry fetched from the segment table is one. The segment-table-lookup process is otherwise the same as the region-second-table-lookup process, including the checking of the table-type bits in the segment-table entry, except that a segment-translation exception is recognized if the invalid bit 270 is one in the segment-table entry. When no exceptions are recognized, the entry fetched from the segment table designates the origin 306 of the corresponding page table (see 316 in FIG. 4)

Figure 4:
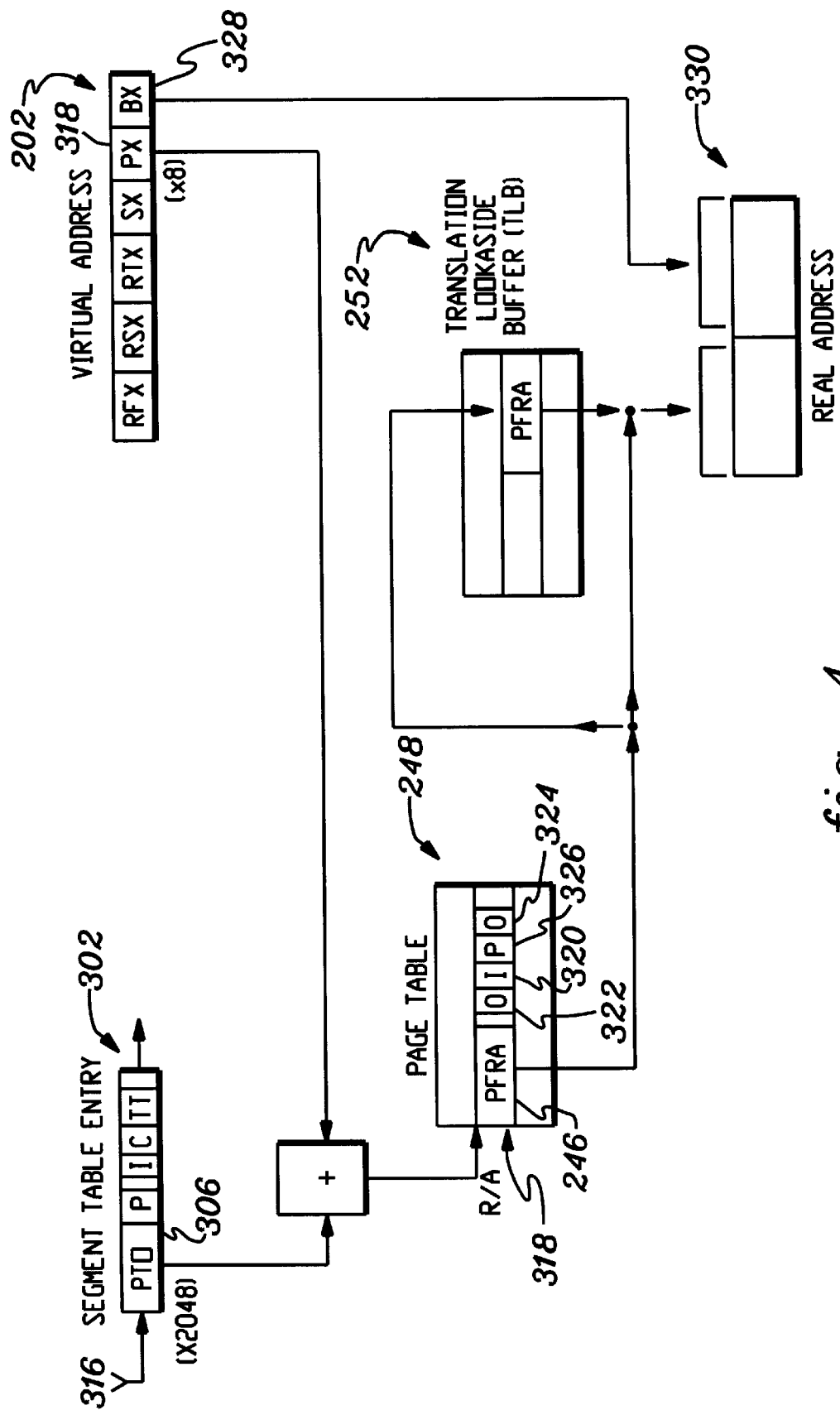

As shown in FIG. 4, the page-index portion 318 of the virtual address 202, in conjunction with the page-table origin 306 contained in the segment-table entry 302, is used to select an entry 318 from the page table 248.

The 64-bit address of the page-table entry 318 in real or absolute storage is obtained by appending 11 zeros to the right of the page-table origin 306 and adding the page index 318, with three rightmost and 53 leftmost zeros appended. A carry out of bit position 0 cannot occur. All 64 bits of the address are used, regardless of whether the current PSW specifies the 24-bit, 31-bit, or 64-bit addressing mode.

All eight bytes of the page-table entry appear to be fetched concurrently as observed by other CPUS. The fetch access is not subject to protection. When the storage address generated for fetching the page-table entry designates a location which is not available in the configuration, an addressing exception is recognized, and the unit of operation is suppressed.

The entry 318 fetched from the page table 248 indicates the availability of the page and contains the leftmost bits of the page-frame real address 246. The page-invalid bit 320 is inspected to establish whether the corresponding page is available. If this bit is one, a page-translation exception is recognized. If portions 322 and 324 of the page table entry contain a one, a translation-specification exception is recognized. If the page-protection bit 326 is one either in the segment-table entry used in the translation or in the page-table entry, and the storage reference for which the translation is being performed is a store, a protection exception is recognized.

When the effective address-space-control element (ASCE) is a region-table designation or a segment-table designation and no exceptions in the translation process are encountered, the page-frame real address 246 is obtained from the page-table entry. When the ASCE is a real-space designation (i.e., bit 212 in the effective ASCE 208 is one), the virtual address except for the byte index is used as a page-frame real address. In either case, the page-frame real address 246 and the byte-index portion 328 of the virtual address 202 are concatenated, with the page-frame real address forming the leftmost part. The result is the real storage address 330 which corresponds to the virtual address. All 64 bits of the address are used, regardless of whether the current PSW specifies the 24-bit, 31-bit, or 64-bit addressing mode.

To enhance performance, the dynamic-address-translation mechanism normally is implemented such that some of the information specified in the region tables, segment tables, and page tables is maintained in a special buffer, referred to as the translation-lookaside buffer (TLB) 252. The CPU necessarily refers to a DAT-table entry in real or absolute storage only for the initial access to that entry. This information may be placed in the TLB, and subsequent translations may be performed by using the information in the TLB. For consistency of operation, the virtual-equals-real translation specified by a real-space designation also may be performed by using information in the TLB. The presence of the TLB affects the translation process to the extent that (1) a modification of the contents of a table entry in real or absolute storage does not necessarily have an immediate effect, if any, on the translation, (2) a region-first-table origin, region-second-table origin, region-third-table origin, segment-table origin, or real-space token origin in an address-space-control element (ASCE) may select a TLB entry that was formed by means of an ASCE containing an origin of the same value even when the two origins are of different types, and (3) the comparison against the table length in an address-space-control element may be omitted if a TLB equivalent of the designated table entry is used. In a multiple-CPU configuration, each CPU has its own TLB.

Entries within the TLB are not explicitly addressable by the program.

Information is not necessarily retained in the TLB under all conditions for which such retention is permissible. Furthermore, information in the TLB may be cleared under conditions additional to those for which clearing is mandatory.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A method of translating a virtual address to a real address, the method comprising:
    indexing into an entry of a first table based on a translation table origin, wherein the entry of the first table comprises a second table origin and a second table offset; and
    indexing into an entry of a second table based on the second table origin and the second table offset, wherein indexing into an entry of the second table comprises:
        comparing an indicator in the virtual address to the second table offset; and
        proceeding with the indexing if the indicator is equal to or greater than the second table offset.

2. The method claim 1, wherein the entry of the first table also comprises a table length indicator, wherein the comparing also comprises comparing the indicator to the table length indicator, and wherein the proceeding comprises proceeding with the indexing if the indicator is equal to or greater than the table offset and less than or equal to the table length indicator.

3. The method claim 1, wherein the second table is a next-lower-level table than the first table.

4. The method of claim 1, wherein the virtual address comprises at least two table indexes, each table corresponding to one of the at least two table indexes, and wherein the indexing into the entry of the second table is also based on an index of the at least two table indexes corresponding to the second table.

5. The method of claim 1, wherein the virtual address comprises at least one table index, and wherein the indexing into the entry of the first table is also based on the at least one table index.

6. A system for translating a virtual address to a real address, comprising:
    means for indexing into an entry of a first table based on a translation table origin, wherein the entry of the first table comprises a second table origin and a second table offset; and
    means for indexing into an entry of a second table based on the second table origin and the second table offset, wherein the means for indexing into an entry of the second table comprises:
        means for comparing an indicator in the virtual address to the second table offset; and
        means for proceeding with the indexing if the indicator is equal to or greater than the second table offset.

7. The system of claim 6, wherein the entry of the first table also comprises a table length indicator, wherein the means for comparing also comprises means for comparing the indicator to the table length indicator, and wherein the means for proceeding comprises means for proceeding with the indexing if the indicator is equal to or greater than the table offet and less than or equal to the table length indicator.

8. The system of claim 6, wherein the second table is a next-lower-level table than the first table.

9. The system of claim 6, wherein the virtual address comprises at least one table index, and wherein the means for indexing into the entry of the first table is also based on the at least one table index.

10. The system of claim 6, wherein the virtual address comprises at least two table indexes, each table corresponding to one of the at least two table indexes, and wherein the means for indexing into the entry of the second table is also based on an index of the at least two table indexes corresponding to the second table.

11. At least one program storage device readable by a machine, tangibly embodying at least one program of instructions executable by the machine to perform a method of translating a virtual address to a real address, the method comprising:
    indexing into an entry of a first table based on a translation table origin and a wherein the entry of the first table comprises a second table origin and a second table offset; and
    indexing into an entry of a second table based on the second table origin and the second table offset, wherein indexing into an entry of the second table comprises:
        comparing an indicator in the virtual address to the second table offset; and
        proceeding with the indexing if the indicator is equal to or greater than the second table offset.

12. The at least one program storage device of claim 11, wherein the entry of the first table also comprises a table length indicator, wherein the comparing also comprises comparing the indicator to the table length indicator, and wherein the proceeding comprises proceeding with the indexing if the indicator is equal to or greater than the table offset and less than or equal to the table length indicator.

13. The at least one program storage device of claim 11, wherein the second table is a next-lower-level table than the first table.

14. The at least one program storage device of claim 11, wherein the virtual address comprises at least two table indexes, each table corresponding to one of the at least two table indexes, and wherein the indexing into the entry of the second table is also based on an index of at least two table indexes corresponding to the second table.

15. The at least one program storage device of claim 11, wherein the virtual address comprises at least one table index, and wherein the indexing into the entry of the first table is also based on the at least one table index.

* * * * *

UNITED STATES PATENT AND TRADEMARK OFFICE
CERTIFICATE OF CORRECTION

PATENT NO. : 6,801,993 B2
DATED : October 5, 2004
INVENTOR(S) : Plambeck

It is certified that error appears in the above-identified patent and that said Letters Patent is hereby corrected as shown below:

Column 3,
Lines 19 and 20, delete "-which-is herein incorporated by." after "(December 2000)" and insert -- . -- after the ")"

Signed and Sealed this

Seventh Day of December, 2004

JON W. DUDAS
*Director of the United States Patent and Trademark Office*